United States Patent
Rockett

(10) Patent No.: US 6,189,945 B1
(45) Date of Patent: Feb. 20, 2001

(54) RACK ASSEMBLY FOR VAN

(76) Inventor: Joseph S. Rockett, 603 Third Ave., Baraboo, WI (US) 53913

(*) Notice: Under 35 U.S.C. 154(b), the term of this patent shall be extended for 0 days.

(21) Appl. No.: 09/406,407

(22) Filed: Mar. 21, 2000

(51) Int. Cl.[7] .................................................. B60N 3/12
(52) U.S. Cl. .......................... 296/37.6; 296/37.1; 296/3; 211/169
(58) Field of Search ................... 296/37.6, 37.1, 296/3; 211/168, 169

(56) References Cited

U.S. PATENT DOCUMENTS

| | | | |
|---|---|---|---|
| 3,957,159 | * 5/1976 | Radek | 211/4 |
| 4,889,377 | * 12/1989 | Hughes | 296/3 |
| 4,898,284 | * 2/1990 | Arens | 296/3 X |
| 4,971,234 | * 11/1990 | Hay | 296/37.6 X |
| 5,015,025 | * 5/1991 | Henriquez | 296/37.6 |
| 5,076,630 | * 12/1991 | Henriquez | 296/37.6 |
| 5,398,987 | * 3/1995 | Sturgis | 296/37.6 |
| 5,498,048 | * 3/1996 | Shelby, Jr. | 296/36.7 X |

* cited by examiner

Primary Examiner—Joseph D. Pape

(57) ABSTRACT

A rack assembly for a van having an access opening, the rack assembly having a rotating portion selectively pivotally movable between a stowed position extending into the van and a useable position extending across the access opening, a stationary portion and a locking arrangement for locking the rotating portion to the stationary portion in the stowed position, the rotating portion including a lattice assembly having a plurality of vertical support members and a plurality of horizontal support members, the plurality of horizontal support members including at least one elongate strip member for supporting a plurality of storage bins thereon and at least one rod shaped member for supporting a plurality of wire spools thereon, one of the vertical support members at an end of the lattice assembly including a base having an aperture that receives a spindle through the aperture with the spindle fixedly secured to a foot that is attachable to the floor of the van adjacent an edge of the rear access opening for providing the pivotal motion of the rotating portion, the stationary portion includes a vertical angle bracket for being fixedly secured to the floor of the van, wherein the locking arrangement functions to interlock the rotating portion to the vertical angle bracket.

2 Claims, 4 Drawing Sheets

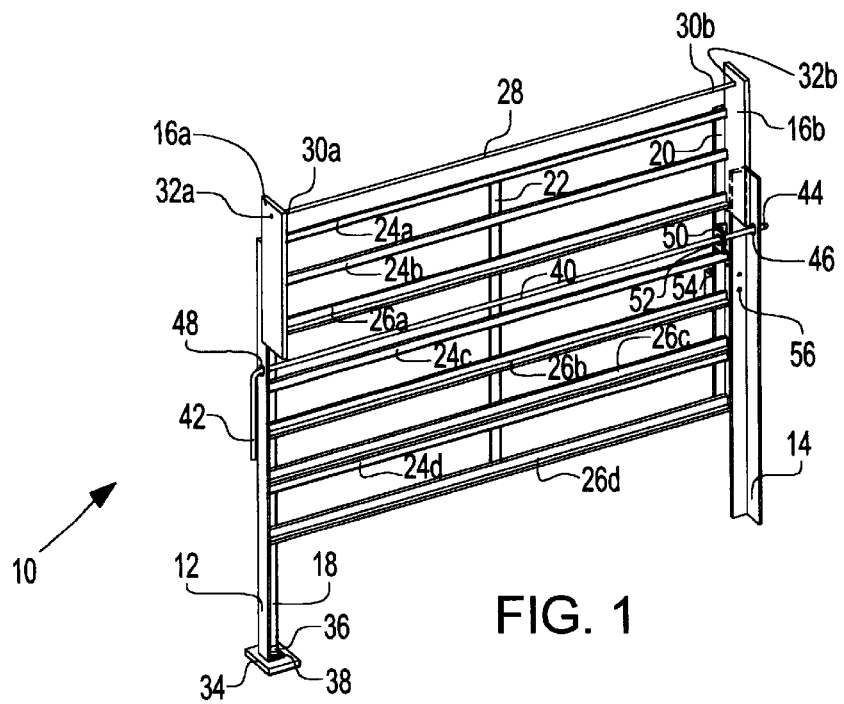
FIG. 1
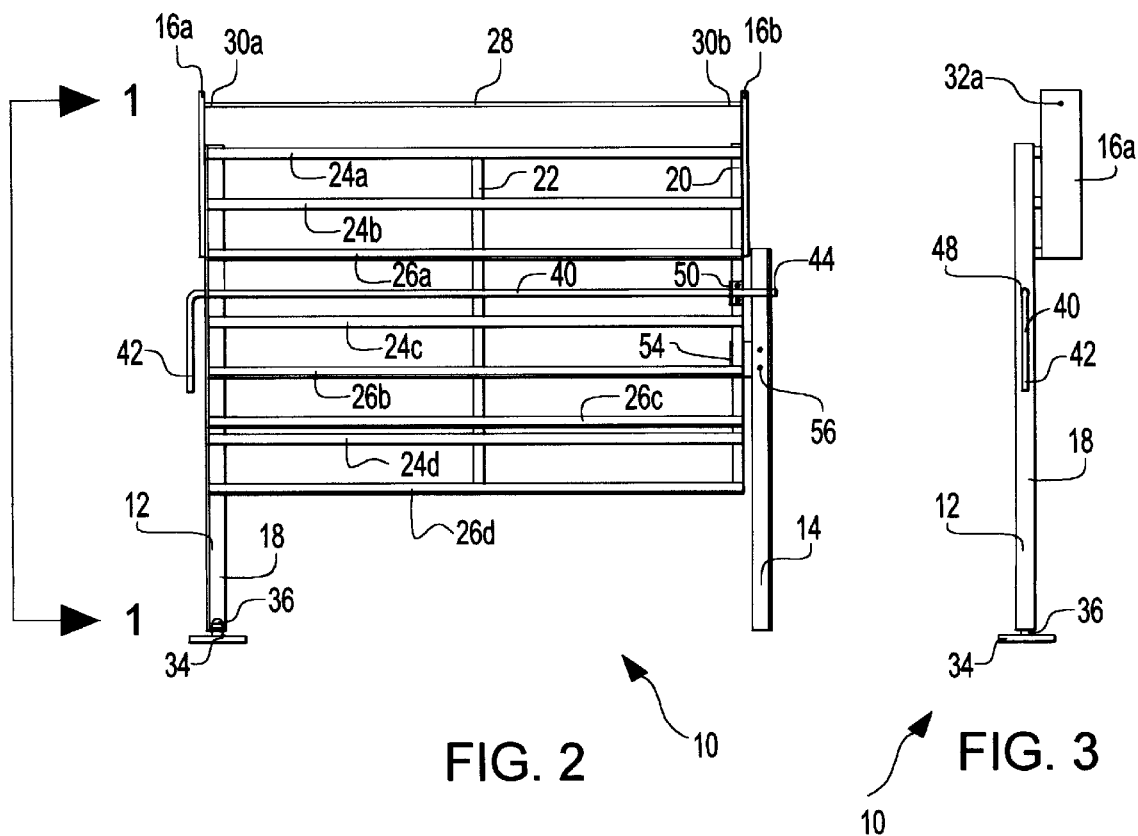
FIG. 2
FIG. 3

RACK ASSEMBLY FOR VAN

BACKGROUND

This version of the invention is concerned with the field of rack assemblies for vans. More specifically, this version of the invention is concerned with rack assemblies for vans that are pivotally or rotatably mounted within the rear portion of vans, said rack assemblies possessing the ability to be pivoted or rotated from the stowed or closed position during transportation and storage to the opened, working position at the rear opening of a van for use at a job site.

PRIOR ART

Motor vehicle vans that are used for commercial purposes frequently provide a dual function in that said vans transport the company owner or employee to the job site, along with the tools, equipment, and supplies that the company owner or employee needs in order to perform the duties associated with the particular trade or profession. These professions normally consist of electrical, mechanical, general construction, surveying, or associated trades in which it is necessary to have on-site access to a wide variety of specialized tools, equipment, and supplies. In most cases, the smaller and more numerous pieces of equipment and supplies, such as wire, various fasteners and conduits are stored in various storage compartments, boxes, and drawer boxes that are arranged and secured within the rear of the motor vehicle van in various configurations. Some of these storage devices may be secured to the sidewalls in the rear of a van or may be temporarily placed on the floor of said van. Some of these storage configurations take advantage of the shape and inner dimensions of the rear of the van so that the most efficient use of carrying space is ensured. As a result, it is common for a large variety and number of equipment and supplies to be stored within the relatively confined space of the rear of a motor vehicle van.

Despite the choice of storage devices and storage configurations, access to a particular storage entity, such as a drawer, box, or case is frequently hampered or obstructed by the relatively confined dimensions of the rear of a van and by the tendency of hand-held tools and other pieces of equipment to be stowed or placed over or in front of said drawers, boxes, or other storage devices, thereby blocking access. To gain access to these storage devices in such conditions, a worker must enter the rear of the van from the front or from the rear doors and walk hunched over or on the knees because of the limited height within the rear of the van to find and access a particular storage device and exit the rear of the van in the same manner. Assuming these positions repeatedly to access the storage devices within the rear of a van can impose health and safety risks, such as stress on the upper and lower back muscles and bumping and lacerating the head, arms, and legs, especially knees and hands.

What is needed then to avoid these injuries while allowing easy access to stowed equipment and supplies is the provision of a storage device or rack assembly that is fitted with a plurality of individual storage or holding bins, boxes, compartments, or containers, said device or assembly locked or fixed in place during transport to a job site and opened or otherwise made available for easy access to the individual storage containers at the entrance to the rear of the van. In this manner, the worker can access the individual pieces of equipment or supplies while standing upright on the same ground surface at that upon which the van rests. The individual storage containers can then be accessed from a natural, upright position, thereby obviating the need to walk hunched over, squat, or kneel within the rear of the van and risk injury.

DISCUSSION OF THE PRIOR ART

The existence of a storage device or rack assembly designed to be maintained within the rear of a van is unknown at the present time. For example, numerous designs for rack assemblies and cargo racks have been provided in the prior art. Even though these designs may be suitable for the specific individual purposes to which they address, they would not be suitable for the purposes of the present version of the invention. For instance:

U.S. Pat. No. 4,092,050, issued to Sobeck on May 30, 1978;
U.S. Pat. No. 4,221,425, issued to Welle et al. on Sep. 9, 1980;
U.S. Pat. No. 4,869,628, issued to Fletcher on Sep. 26, 1989; and
U.S. Pat. No. 5,127,697, issued to St. Marie on Jul. 7, 1992.

Sobeck discloses a rack assembly for a land vehicle that is designed primarily for crop harvesting, specifically hauling large round bales of hay, stray, and the like. This device, which it to be secured to a land vehicle chassis of the type commonly found in agricultural enterprises, consists of a pair of load-carrying racks pivotally mounted upon said land vehicle. Said racks are designed to transport and unload as needed various agricultural products as described previously.

A van attachment is disclosed by Welle et al. that is used primarily as a means to provide an attachment for a van-type motor vehicle. Said attachment adapts a van for outdoor excursions and functions by attaching to the rear aperture of a van to provide an overhead shelter to the rear of the van and to accommodate camping provisions and facilities.

Fletcher teaches a truck cargo rack that is designed primarily to work within the bed and sidewalls of pickup trucks and other trucks fitted with carrying beds. The rack functions by carrying and holding in place a fifty five gallon drum in a horizontal position so as to lower its center of gravity and thus more safely transport it.

St. Marie discloses an inconspicuous expandable van compartment device, which is comprised of a platform that can be cantilevered out from the vehicle body on an interlocking rail and bearing system. The platform can be mechanized using an electric motor and various gear drive systems and can be enclosed using side walls, a back wall, and a roof and thereby made weatherproof for use in combination with a camper vehicle.

As illustrated by the background art, efforts are continuously being made in an attempt to develop devices to improve or expand the carrying capacity of vans and trucks. No prior effort, however, provides the benefits attendant with the present invention. As such, it may be appreciated that there is a continuing need for a new and improved rack assembly for vans that is rotatably or pivotally secured to the interior of the rear of a van so that said rack can be closed in an unobtrusive position and maintained in an open position to allow easy access to items stored on the rack assembly. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY

The present version of the invention, which will be described in greater detail hereinafter, relates to the field of rack assemblies for vans. More specifically, this version of the invention is concerned with rack assemblies for vans that are pivotally or rotatably mounted within the rear portion of vans, said rack assemblies possessing the ability to be pivoted or rotated from the stowed or closed position during transportation and storage to the opened, working position at the rear opening of a van for use at a job site. My version of the invention overcomes all of the shortcomings listed previously, in addition to novel aspects that will be described in detail hereinafter.

Described briefly, according to a typical embodiment, the invention presents a rack assembly for motor vehicle vans that provides the means to store various tools and equipment during transportation and non-use and to present said tools and equipment for easy access during use. The rack assembly consists in general terms of a pivoting or rotating member and a stationary or fixed member. A locking mechanism attached to the rotating portion communicates with the stationary member and maintains the rotating portion in the locked or stowed position during non-use and allows the rotating portion to be rotated to the rear opening of a motor vehicle van. In this manner, various pieces of equipment and tools can be accessed from an upright standing position.

The rotating portion of the rack assembly consists of a plurality of elongate strip members that are arranged into a lattice or grid assembly upon which the tools and equipment are stored. The lattice or grid assembly is comprised of horizontally-aligned support members that support a multiplicity of holding bins, wire spools, or a combination of both, and vertical support members that are secured to the horizontally-aligned support members in perpendicular relation. In this manner, the vertical support members maintain the horizontal support members at the optimum height in relation to the user when the rack assembly is in the open position. The horizontal support members consist of strip-like members upon which equipment holding bins are releasably secured and rod-like members that receive and maintain wire spools. The rack assembly can be comprised of a variety of horizontal support members: either entirely elongate strip members or rod-like members or a combination of each in varying proportion.

Three vertical support members maintain the horizontal support members at the optimum height and relation, said support members consisting of a pivoting vertical support member, a middle vertical support member, and an end support member. The pivoting vertical support member is attached to a foot member by way of a spindle, which allows the vertical support member and by extension the rotating portion in whole to pivot or rotate in relation to the foot member or floor of the motor vehicle van. The foot member is permanently secured to the floor of said van by means of threaded fasteners, welding, or other suitable means. A stationary member, permanently attached to the van floor in perpendicular relation resides at a proximate parallel distance to the end support member.

A rod-shaped locking mechanism is disposed within apertures formed medially within the pivoting vertical support member and the end vertical support member so that the locking mechanism is maintained in perpendicular relation to said support members. One end of the locking mechanism communicates with an aperture disposed within the stationary member. To accomplish the closed or stowed position, the locking mechanism is passed through the apertures of the two support members and the stationary member. As the pivoting support member and stationary member are permanently secured to the floor of the van, the rotating portion of the rack assembly is secured in place. The rack assembly is rendered in the open or usable position be sliding the locking mechanism horizontally away from the aperture of the stationary member so that the locking mechanism clears said aperture. The rotating portion is thus turned from the stowed position to the rear of the van at which point the equipment and tools stored upon the rack assembly are presented for retrieval.

The rack assembly can be manufactured of a wide variety of materials that possess the necessary qualities of strength, durability, ease of manufacture and construction, and competitiveness in price. These materials can consist of steel, aluminum, fiberglass, composites, and the like.

My invention, therefore, resides not in any one of these features per se, but rather in the particular combination of all of them herein disclosed. It is distinguished from the prior art in this particular combination of all of its structures for the functions specified. In as much as the foregoing has outlined rather broadly the more pertinent and important features of the present invention in order that the detailed description of the invention that follows may be better understood so that the present contribution to the art can be more fully appreciated. Additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

Accordingly, it is an object of my version of the invention to provide a low-cost, easy-to-manufacture, and easy-to-market rack assembly for motor vehicle vans.

A further object of my version of the invention is to provide an easy-to-use and versatile rack assembly for motor vehicle vans.

A significant object of the invention is to provide a rack assembly for vans that is capable of stowing tools and equipment in a wide variety of forms, such as holding bins or wire spools.

A final but very significant object of the invention is to provide a rack assembly for motor vehicle vans that is stowed unobtrusively and efficiently within the rear of a motor vehicle van during non-use and is rotated or turned to the entrance area at the rear of a van in an upright position thus presenting the stored contents to the user at the optimum height and distance above the ground surface, thus obviating the necessity of the user to crawl or kneel within the rear of the van to gain access to said items or storage.

For a better understanding of the invention, its operating advantages and the specific objects attained by its uses, reference should be had to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention illustrated by the accompanying drawings.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

FIG. 1 is a perspective view of the rack assembly for van in accordance with the present version of the invention illustrated without wire spools and holding bins thus revealing the construction thereof.

FIG. 2 is a front elevation view of the rack assembly.

FIG. 3 is a side elevation view of the rack assembly taken along line 1—1 of FIG. 2.

DRAWING REFERENCE NUMERALS

Figure 4:
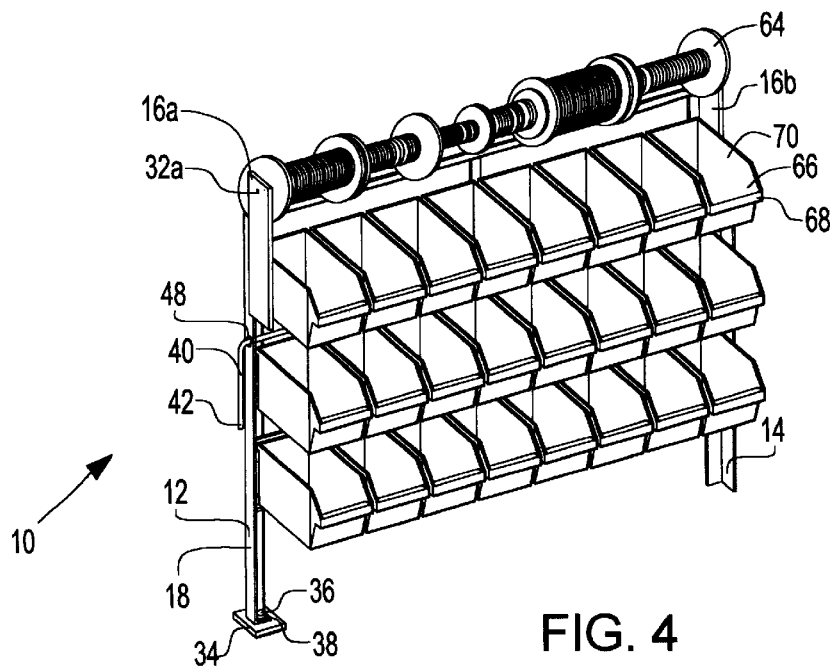
FIG. 4 is a perspective view of the rack assembly for van in one configuration shown with three rows of holding bins and one row of wire spool.

10 Rack Assembly For Van
12 Rotating Portion of Rack Assembly
14 Stationary Member of Rack Assembly
16a, b Wire Spool Support Members
18 Pivoting Vertical Support Member
20 End Vertical Support Member
22 Middle Vertical Support Member
24a, b, c, d Horizontal Support Members
26a, b, c, d Horizontal Support Members
28 Horizontal Rod Member
30a, b Ends of Horizontal Support Member
32a, b Apertures of Wire Spool Support Members
34 Foot of Pivoting Vertical Support Member
36 Spindle
38 Aperture of Pivoting Vertical Support Member
40 Locking Rod
42 Handle Portion of Locking Rod
44 End of Locking Rod
46 Aperture of Stationary Member of Rack Assembly
48 Aperture of Pivoting Vertical Support Member
50 Guide Member
52 Aperture of Guide Member
54 Retaining Member
56 Fasteners of Retaining Member
58 Fasteners of Guide Member
60 Face Plate of Retaining Member
62 Face Plate of Guide Member
64 Wire Spool
66 Removable Bin
68 Grasping Handle
70 Cavity
72 Retaining Slot
74 Van
76a, b Rear Doors of Van

DESCRIPTION OF THE PREFERRED EMBODIMENT

Description

Referring now to the drawings and, in particular, to FIG. 1, FIG. 2, and FIG. 3 wherein there are illustrated a typical embodiment of the rack assembly for vans 10. The present version of the invention 10 consists of a device that is secured in an upright vertical position within the rear area of a motor vehicle van proximate to the rear entrance of said van so that the rack assembly 10 can provide easy access to the storage items maintained thereon when the rack assembly 10 is in the open or usable position. In the preferred design, the rack assembly 10 is maintained in the closed or stowed position at one side of the rear or the van in parallel relation to the longitudinal axis of the van, preferably adjacent to one of the side walls so that access to the center area of the rear of the van is not compromised or obstructed. To position the rack assembly 10 for use, it is necessary to rotate or turn the rotating portion 12 of the rack assembly 10 from the closed position to the open position. In this manner, the storage items are presented to the user for easy access in that the user can access said items by standing upright on the ground surface and facing the rear of the van and the rack assembly 10. The storage items are maintained at a height commensurate with the torso area of the user so that ergonomic efficiency is achieved during retrieval and placement of the storage items as necessary.

Referring again to FIG. 1, FIG. 2, and FIG. 3, the rack assembly 10 is comprised of two basic components, the rotating portion 12 and the stationary member 14. The rotating portion 12 is secured to the floor of the rear of the van by a cylindrically-shaped spindle 36 and foot member 34. The stationary member 14 can be secured at a variety of locations, most typically the floor or wheel well of the van or adjacent storage racks or shelves. The rack assembly can be manufactured of material that possesses the required characteristics of strength, rigidity, light weight, low acquisition and manufacturing cost, and high availability with steel, aluminum, fiberglass, high-strength plastic or composites, or other material fulfilling the requirements.

The rotating portion 12 is designed as a lattice or grid assembly of vertical support members 18, 20, 22 and horizontal support members 24a, b, c, d, 26, a, b, c, d, 28 which are disposed in perpendicular relation to the vertical support members 18, 20, 22. The vertical support members and horizontal support members can be attached or joined together using a variety of means, such as threaded fasteners, welding, bonding, or a combination thereof. The vertical support members 18, 20, 22 function to maintain the horizontal support members 24a, b, c, d, 26, a, b, c, d, 28 at the optimum height and attitude for efficient retrieval of the storage items when the rack assembly 10 is opened, in addition to maintaining the overall rack assembly 10 in the secure upright vertical position at the closed and open locations. The horizontal support members are comprised of elongate, strip members 24a, b, c, d, 26, a, b, c, d, and rod-shaped members 28 so that a variety of items can be stored. The elongate strip members 24a, b, c, d, 26, a, b, c, d are designed for supporting rectangular storage bins 66 (FIG. 4), and the rod-shaped 28 members are used for supporting a variety of wire spools 64 (FIG. 4). With these components, the rack assembly 10 can be provided in a variety of configurations, consisting wholly of flat elongate members or rod-shaped members, or a combination of each in varying proportion. As illustrated in this embodiment, the rack assembly 10 is comprised of one rod-shaped member 28, and three sets of strip-shaped members for supporting three rows of storage bins 66, eight storage bins to a row. The elongate strip members are further defined by flat strip members 24a, b, c, d and angled strip members 26a, b, c, d. The flat strip members 24a, b, c, d are fitted into the rear retaining slot of the removable bins 66, which are additionally supported at the bottom rear, horizontal corner by the angled strip members 26a, b, c, d.

Figure 7:
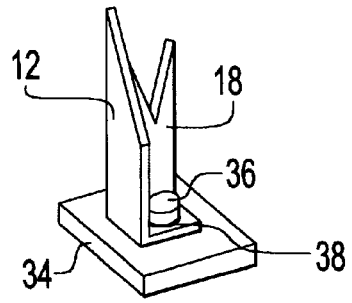
FIG. 7 is a fragmentary, perspective view of the pivoting vertical support member of the rack assembly illustrating in detail the foot member and spindle.

The vertical support members 18, 20, 22 are disposed in equidistant, parallel relation to each other so that maximum support is furnished to the horizontal support members, thereby providing a sturdy, non-flexing rotating portion 12. The pivoting support member 18 is comprised of an elongate, angled member with side walls that are disposed in perpendicular relation. As shown in FIG. 7, one end of the pivoting support member 18 is fitted with a base that receives and maintains a spindle 36 through an aperture 38 in rotating engagement, said spindle 36 fixedly secured to a foot member 34 that is attached to the floor of the van. In this manner, the pivoting vertical support member 18 and by extension the rotating portion 12 of the rack assembly 10 is able to rotate or turn from the closed to the open position.

The horizontal support members 24a, b, c, d, 26, a, b, c, d are perpendicularly attached at one end to the pivoting vertical support member 18 with the opposing end of said horizontal support members attached in identical relation to the end vertical support member 20. A middle vertical support member 22 is medially attached to the horizontal support members. In this embodiment, a pair of wire spool support members 16a, b are provided with one wire spool support member 16a attached to the pivoting vertical support member 18 and the second wire spool support member 16b attached to the stationary member 14, both wire spool support members aligned in parallel relation to their respective vertical support members. Apertures 32a, b are provided near the unattached ends of the wire spool support members, said apertures provided to receive and maintain the distal ends 30a, b of a horizontal rod member 28 that supports a plurality of wire spools 64.

A locking rod 40 in the form of an elongate, cylindrically-shaped rod maintains the rack assembly 10 in the stowed or closed position with manipulation of said rod 40 permitting rotating portion 12 of the rack assembly 10 to assume the open or usable position as described earlier. The locking rod 40 consists of a handle portion 42 at one end that is disposed in perpendicular relation to the longitudinal axis of the locking rod 40 in general and a distal end 44. The locking rod 40 is received by and maintained in an aperture 48 located medially within a sidewall of the pivoting vertical support member 18, an aperture 46 within a sidewall of the stationary member 14, and an aperture 52 of a guide member 50, which is attached to the end vertical support member 20. The handle portion 42 of the locking rod 40 is maintained adjacent to the outer side wall of the pivoting vertical support member 18 while the distal end 44 of the locking rod 40 is maintained within and through the aperture 52 of the guide member 50 and the aperture 46 of the stationary member 14.

Figure 8:
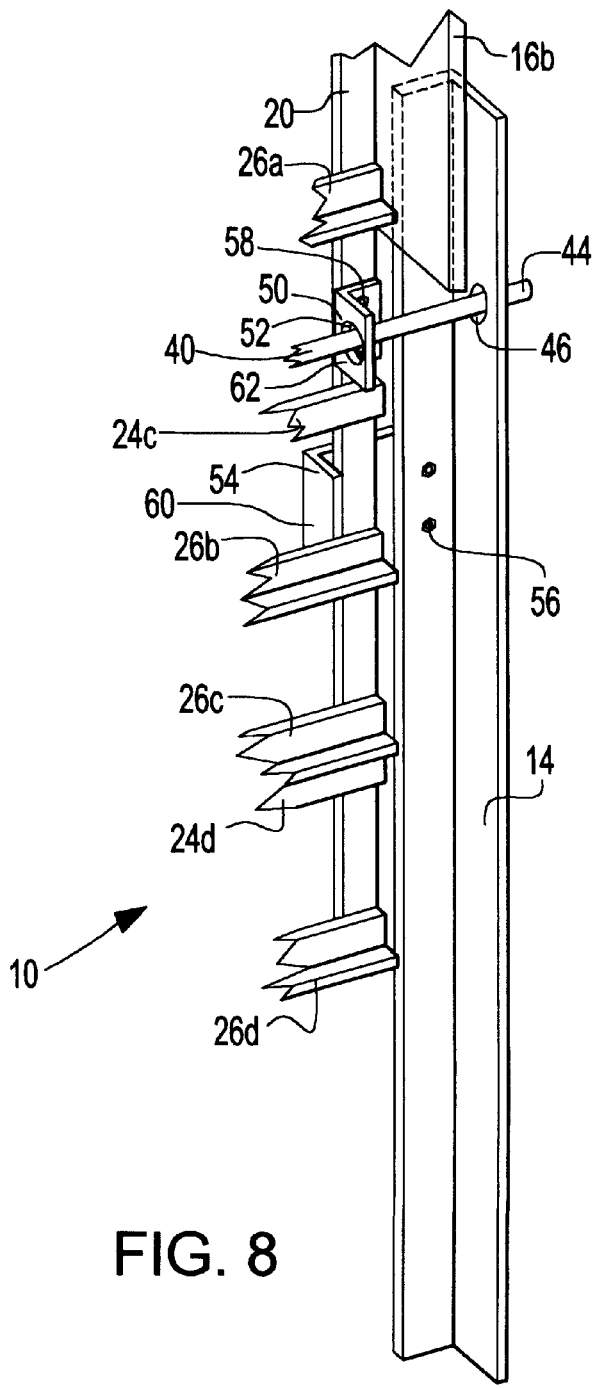
FIG. 8 is a fragmentary, perspective view of the stationary member of the rack assembly illustrating in detail the guide and retaining members.

The rack assembly 10 in the closed position is illustrated in detail in FIG. 8. The guide member 50, which is attached to the end vertical support member 20 with fasteners 58, consists of a face plate 62 in which the aperture 52 is formed, said aperture aligned coaxially with the aperture 44 of the stationary member 14. In this manner, the locking rod 40 passes through both apertures 46, 52 and prevents the rotating portion 12 of the rack assembly from rotating or swinging away from the stationary member 14. The rotating portion 12 is further maintained in closed alignment by a retaining member 54 that is attached to the stationary member 14 with fasteners 56. A face plate 60 of the retaining member 54 in conjunction with the inside edge of the stationary member 14 clasps the end vertical support member 20 therewith and prevents horizontal or lateral movement of the rotating portion 12 of the rack assembly 10 during storage and transport.

Figure 5:
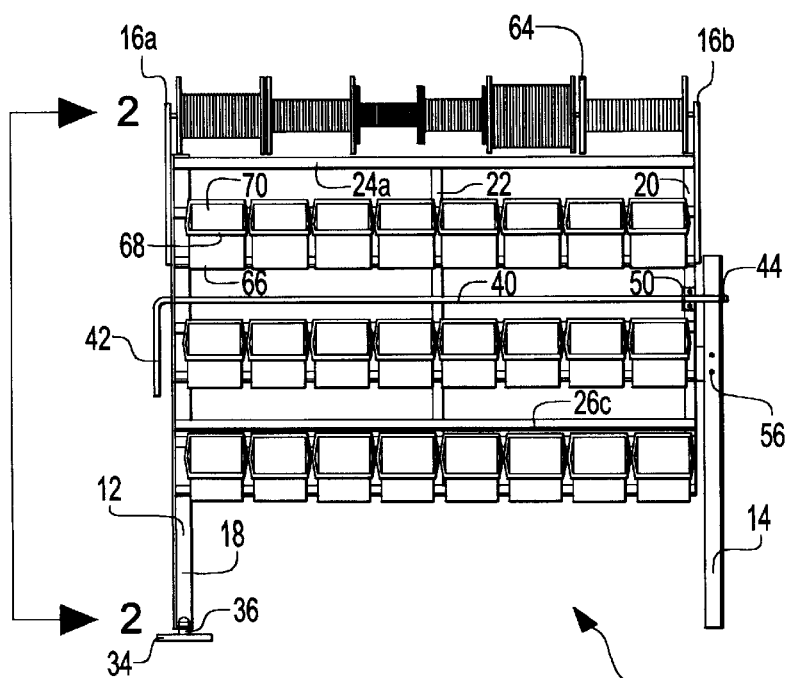
FIG. 5 is a front elevation view of the rack assembly for van illustrated as configured in FIG. 4.
Figure 6:
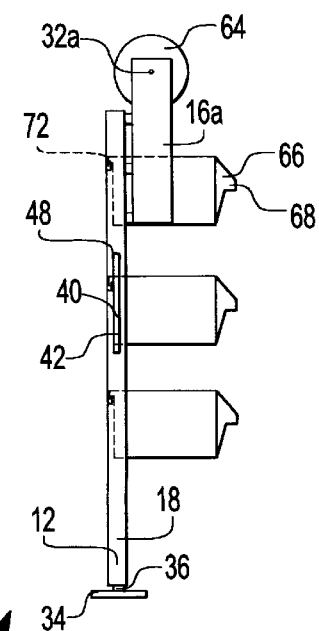
FIG. 6 is a side elevation view of the rack assembly for van taken along line 2—2 of FIG. 5.

As shown in FIG. 4, FIG. 5, and FIG. 6, the rack assembly 10 is outfitted with a plurality of wire spools 64 and removable bins 66. The center aperture of the wire spools 64 are received by the horizontal rod member 28 that is attached to the wire spool support members 16a, b. The removable bins 66, which are rectangular in shape, closed on five sides and enclosing a space or cavity 70 therein, and fitted with a grasping handle 68, are secured to the rack assembly in releasable engagement by a retaining slot 72 (FIG. 6) that fits over one edge of the flat strip members 24a, b, c, d and a rear bottom, horizontal edge that rests against the inside corner of the angled strip members 26a, b, c, d. The removable bins 66 are maintained in place by the downward pressure or gravity imposed upon said bins.

Figure 9:
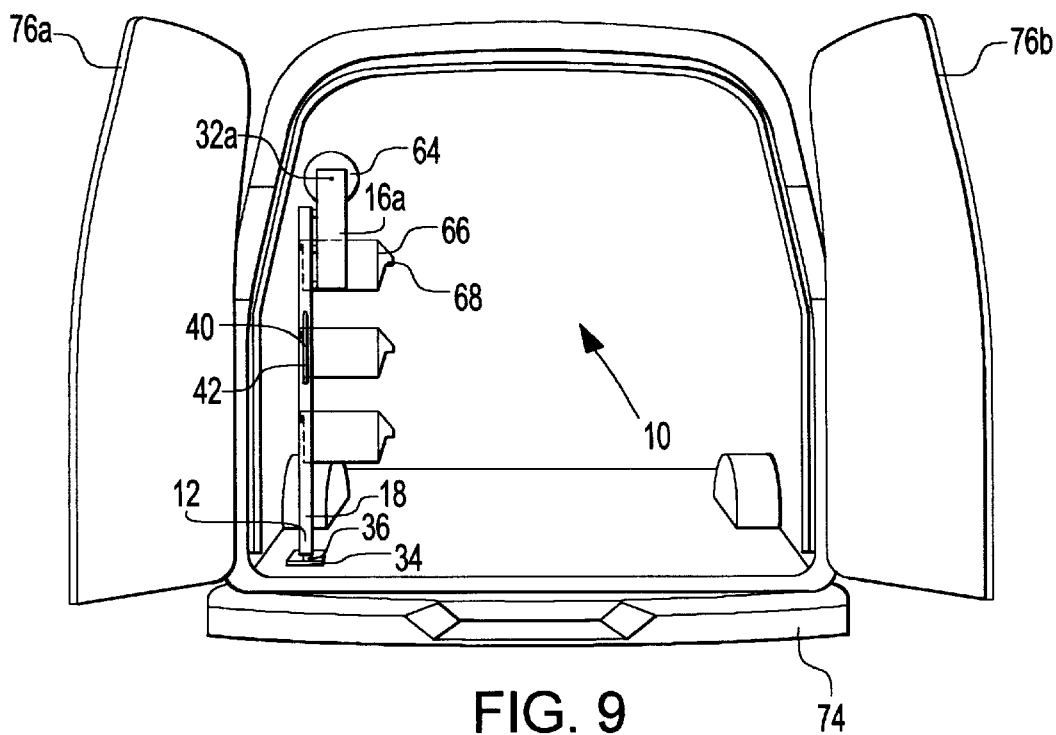
FIG. 9 is an elevation view of the rack assembly for van illustrating the present version of the invention mounted within the rear portion of a van and maintained in the stowed or closed position.
Figure 10:
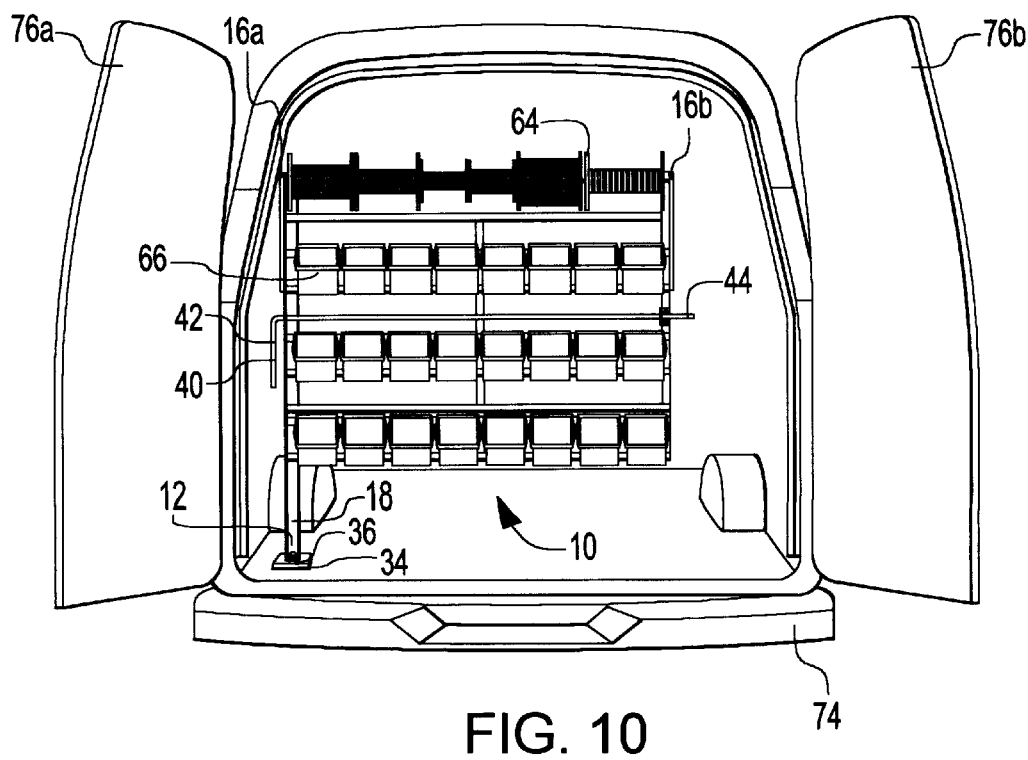
FIG. 10 is an elevation view of the rack assembly for van illustrating the present version of the invention mounted within the rear portion of a van and pivoted to the working or open position at the rear aperture of the van.

The preferred use of the rack assembly 10 is illustrated in FIG. 9. and FIG. 10. During storage as shown in FIG. 9, the rack assembly 10 is maintained within the rear of the van 74 in the closed or stowed position as described previously. As the illustration reveals, the stowed rack assembly 10 is maintained in close proximity to one of the side walls of the van, allowing access to the center portion of the rear of the van. Upon arrival at a job site, the end 44 of the locking rod is passed through the aperture 46 of the stationary member 14 so that the rotating portion 12 of the rack assembly 10 is free to turn or rotate to the entrance at the back of the van 74. In this manner, the wire spools 64 and removable bins 66 are presented to the user at the optimum height above the ground surface so that the user can access tools and equipment in an upright, standing position without the necessity of bending, crawling, or stooping within the enclosed area of the rear of the van 74.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Conclusion and Scope of Invention

From the foregoing, it will be understood by persons skilled in the art that an improved rack assembly for motor vehicle vans has been provided that allows tools and equipment and other items stored within the rack assembly to be accessed easily and efficiently in an upright standing position without the need to crawl, stoop, or kneel within the rear area of a van. The invention is relatively simple and easy to manufacture, yet affords a variety of uses. While my description contains many specificities, these should not be construed as limitations on the scope of the version of the invention, but rather as an exemplification of the preferred embodiment thereof. The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What I claim as my invention is:

1. A rack assembly for a van having an access opening, the rack assembly comprising a rotating portion selectively pivotally movable between a stowed position extending into the van and a useable position extending across the access opening, a stationary portion and means for locking the rotating portion to the stationary portion in the stowed position, the rotating portion including a lattice assembly having a plurality of vertical support members and a plurality of horizontal support members, the plurality of horizontal support members including at least one elongate strip member for supporting a plurality of storage bins thereon and at least one rod shaped member for supporting a plurality of wire spools thereon, one of the vertical support members at an end of the lattice assembly including a base having an aperture that receives a spindle through the aperture with the spindle fixedly secured to a foot that is attachable to the floor of the van adjacent an edge of the rear access opening for providing the pivotal motion of the rotating portion, the stationary portion includes a vertical angle bracket for being fixedly secured to the floor of the van, wherein the means for locking functions to interlock the rotating portion to the vertical angle bracket.

2. The rack assembly of claim 1 wherein the means for locking includes a locking rod slidably received by the rotating portion and selectively received in an aperture in the vertical angle bracket of the stationary portion for selectively locking the rotating portion in the stowed position.

* * * * *